(12) United States Patent
Berkheimer et al.

(10) Patent No.: US 8,884,563 B2
(45) Date of Patent: Nov. 11, 2014

(54) SYSTEM AND METHOD FOR SUPPLEMENTING A GENERATED DC POWER SUPPLY

(75) Inventors: John Berkheimer, Scottsdale, AZ (US); Jerry Fan, Birmingham, AL (US); Jianchu Zheng, Shanghai (CN)

(73) Assignee: Jerry Fan, Birmingham, AL (US)

( * ) Notice: Subject to any disclaimer, the term of this patent is extended or adjusted under 35 U.S.C. 154(b) by 164 days.

(21) Appl. No.: 13/309,503

(22) Filed: Dec. 1, 2011

(65) Prior Publication Data

US 2012/0313563 A1 Dec. 13, 2012

Related U.S. Application Data

(60) Provisional application No. 61/418,864, filed on Dec. 2, 2010.

(51) Int. Cl.

| | | |
|---|---|---|
| *H02P 27/00* | (2006.01) | |
| *H02J 3/00* | (2006.01) | |
| *H02J 3/14* | (2006.01) | |
| *H02J 5/00* | (2006.01) | |
| *H02J 1/10* | (2006.01) | |
| *H02P 27/08* | (2006.01) | |
| *H02P 6/16* | (2006.01) | |
| *H02P 29/02* | (2006.01) | |

(52) U.S. Cl.
CPC . *H02P 6/16* (2013.01); *H02J 1/102* (2013.01); *H02P 27/08* (2013.01); *H02P 29/026* (2013.01)
USPC .............. 318/400.3; 363/34; 363/37; 307/31; 307/58; 307/112; 318/800; 318/801

(58) Field of Classification Search
None
See application file for complete search history.

(56) References Cited

U.S. PATENT DOCUMENTS

| | | | |
|---|---|---|---|
| 4,193,111 A | | 3/1980 | wester |
| 5,402,082 A | * | 3/1995 | Eccleston et al. ............. 327/530 |
| 6,339,413 B1 | * | 1/2002 | Drake et al. .................... 345/50 |
| 6,465,909 B1 | | 10/2002 | Soo et al. |
| 6,611,068 B2 | | 8/2003 | Cratty |
| 7,117,044 B2 | * | 10/2006 | Kocher et al. ................... 700/34 |
| 7,405,497 B2 | | 7/2008 | Jacobs et al. |
| 7,502,233 B2 | * | 3/2009 | Kim et al. ........................ 363/16 |
| 7,507,151 B1 | | 3/2009 | Parker et al. |
| 8,319,570 B2 | * | 11/2012 | Wilson ........................... 332/109 |
| 2008/0265680 A1 | * | 10/2008 | Marwali et al. ................ 307/65 |
| 2009/0033289 A1 | * | 2/2009 | Xing et al. ..................... 320/140 |
| 2010/0110085 A1 | * | 5/2010 | Samuel et al. ................. 345/519 |
| 2011/0068723 A1 | * | 3/2011 | Maiocchi .................... 318/400.3 |
| 2011/0095837 A1 | * | 4/2011 | Wilson ........................... 332/109 |

* cited by examiner

*Primary Examiner* — Eduardo Colon Santana
*Assistant Examiner* — Devon Joseph
(74) *Attorney, Agent, or Firm* — Scott A. Hill; The Hill Law Firm, PLC

(57) ABSTRACT

A renewable energy source is converted into a desired DC voltage that is delivered to a DC motor controller of a permanent magnet motor. A micro controller monitors the amount of supplied renewable DC having the desired DC voltage, which is delivered to each phase of the motor by turning on FET switches on demand. If the renewable DC available at a given instant is not adequate to power a particular phase of the motor, then the micro controller turns on backup FET switches that are part of an independent drive circuit that is in parallel with drive circuits of the renewable DC power circuit, to deliver to the motor line DC, which is produced from an AC supply that has gone through an AC to DC converter. Once charged, the renewable DC power will power the next available phase of the motor.

15 Claims, 4 Drawing Sheets

SYSTEM AND METHOD FOR SUPPLEMENTING A GENERATED DC POWER SUPPLY

This application claims the benefit of priority of U.S. Provisional Application No. 61/418,864, filed on Dec. 2, 2010, and titled "System and method for supplementing a generated DC power supply", incorporated herein by reference in its entirety.

BACKGROUND OF THE INVENTION

Peak electrical power use by most businesses and homes is during daylight hours, especially during summer months when air conditioning use is highest. Geographical regions that are sunny are ideal for solar energy collection, such as with photovoltaic cells. Typically, solar energy collection is used to either charge a primary power source, such as battery storage for powering lights at night, or collected solar energy is converted into AC that is fed into an existing system that is primarily supplied with grid power. Some devices, such as toy pool fountains and animated garden decorations, operate only when the sun is adequately shinning directly onto small solar cells that power the toy.

There is a need to maximize the use of available renewable power, such as wind or solar DC power, without requiring expensive and heavy batteries that have a relatively short life, but also without sacrificing the availability or reliability of a device that is powered by a renewable energy source. FIG. 1 shows a known method of delivering a single source of DC power to a three phase brushless DC motor.

SUMMARY OF THE INVENTION

The present invention is an electrical circuit and computer program system for delivering power from a renewable energy source to a nearby device that preferably and primarily uses power provided by the renewable source. In the preferred embodiment, circuitry of the system allows grid power to supplement the device when the renewable power output does not adequately meet the immediate demands of the device. The circuitry continues to maximize use of the renewable energy until the output is sufficient to operate the device independently. In the preferred embodiment, the load is a permanent magnet motor that rotates a fan and the renewable energy is a solar DC supply. Because the demand for air movement is typically highest when the sun is high and bright, application of the present invention in an evaporative cooling system would be useful.

Figure 1:
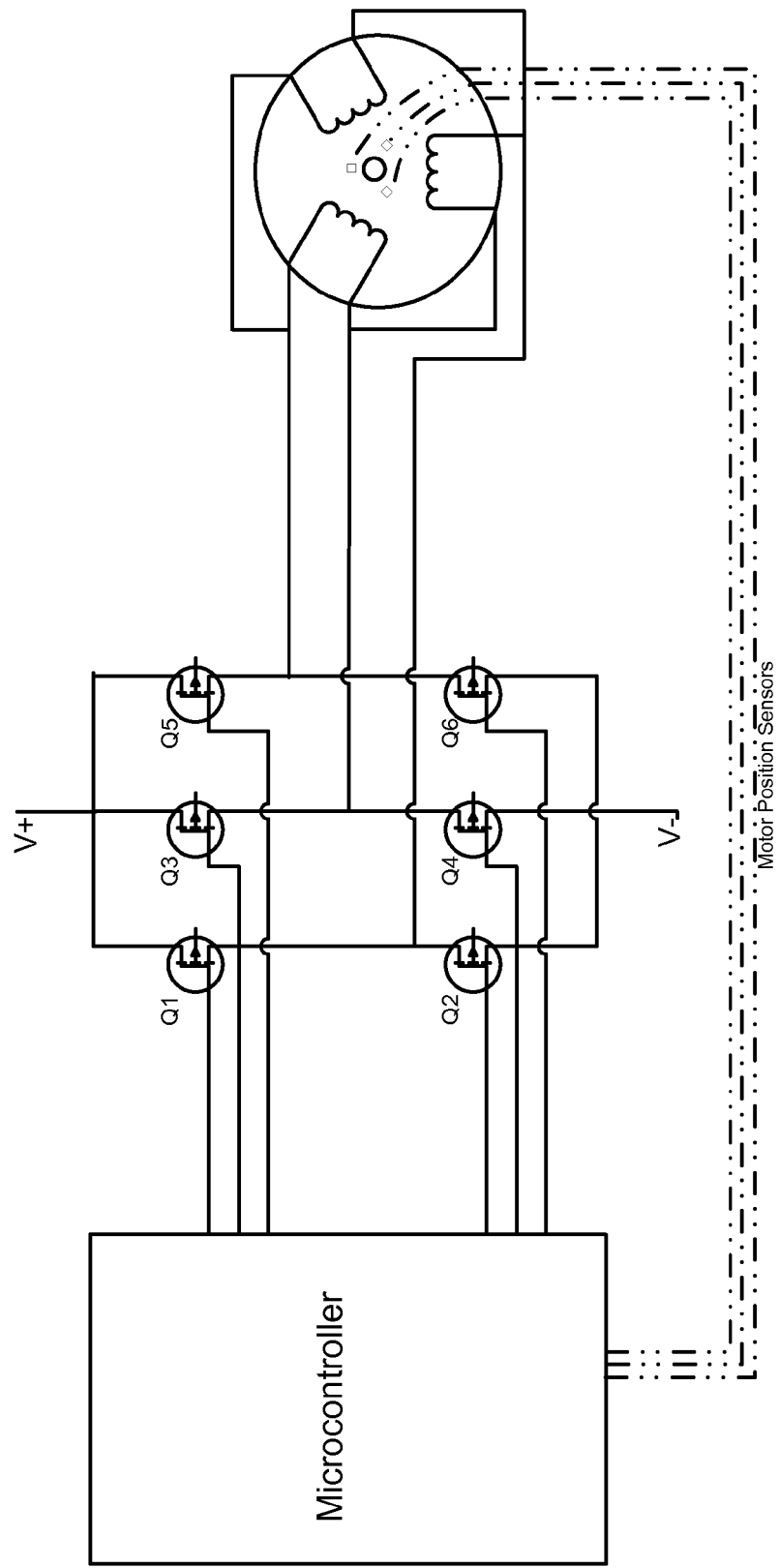
FIG. 1 is a partial circuit diagram showing the main components and circuit paths of a typical prior art device.

The following is the list of numerical callouts used in FIGS. 1-4:
10 solar panel array
12 DC supply
14 DC to DC converter
16 solar DC (V1)
20 sensor line
26 DC motor controller
28 permanent magnet motor
30 micro controller (MCU)
34 AC supply
36 AC to DC converter
38 line DC (V2)
40 MCU Power

DETAILED DESCRIPTION OF THE INVENTION

This detailed description will describe an electrical system and method for reliably powering a device using a renewable energy source, such as a solar DC supply. Preferably, an electrical circuit of the present invention has a renewable DC supply 12 that is converted into a desired DC voltage 16 that is delivered to a DC motor controller 26 of a permanent magnet motor 28. A micro controller 30 of the system monitors the amount of supplied solar DC 16 having the desired DC voltage. Renewable DC power is delivered to each phase of the motor by turning on FET switches on demand. If the maximum power available from solar panels 10 at a given instant is not adequate to power a particular phase of the motor of the system, then the micro controller turns on backup FET switches of a different half bridge to deliver to the motor line DC 38, which is produced from an AC supply 34 that has gone through an AC to DC converter 36. Hopefully the renewable DC power will be available for the next phase of the motor. Additional features, such as diodes, voltage monitors, displays and surge protectors, will be discussed. Where reference numbers in one figure are the same as another figure, those reference numbers carry substantially the same meaning. Preferred components, steps, uses and configurations will be discussed, but these preferences are not intended to exclude other suitable or functionally equivalent components, steps, uses and configurations.

Renewable energy is most cost effectively produced by harnessing wind or solar, but other known resources could be substituted to attain similar results using the circuitry and logic of the present invention. By way of example, but not limitation, in FIG. 1 an array of solar panels 10 is used to generate "solar DC" 16, a term we will use throughout this description. Because solar DC is preferred, the term "V1" will refer to voltage generated by solar collectors, but V1 could be wind DC or another renewable energy source. The size and arrangement of solar panels is not particularly important so long as the generated solar DC adequately meets the needs of a device. Preferably, the amount of solar DC available at peak solar panel output in the summer is at least adequate to fully power the device without being supplemented by grid power, which we will call "line DC" 38 throughout this description. The term "V2" will refer to voltage from the line DC source, but V2 could be yet another renewable energy source, such as a system that uses solar power that is backed up by wind power. A typical solar system will produce more power than needed for a portion of many summer days. Whether solar panels track the sun or otherwise are positioned to improve power generation is an important consideration that we will not address. For the present example, we will assume that a fixed array of four 125 watt solar panels is mounted to a roof, so the maximum rated output will be 500 watts, and we will assume a DC output of the array that is between about 5 and 15 volts. A surge protector can be added to protect the DC to DC converter.

Figure 3:
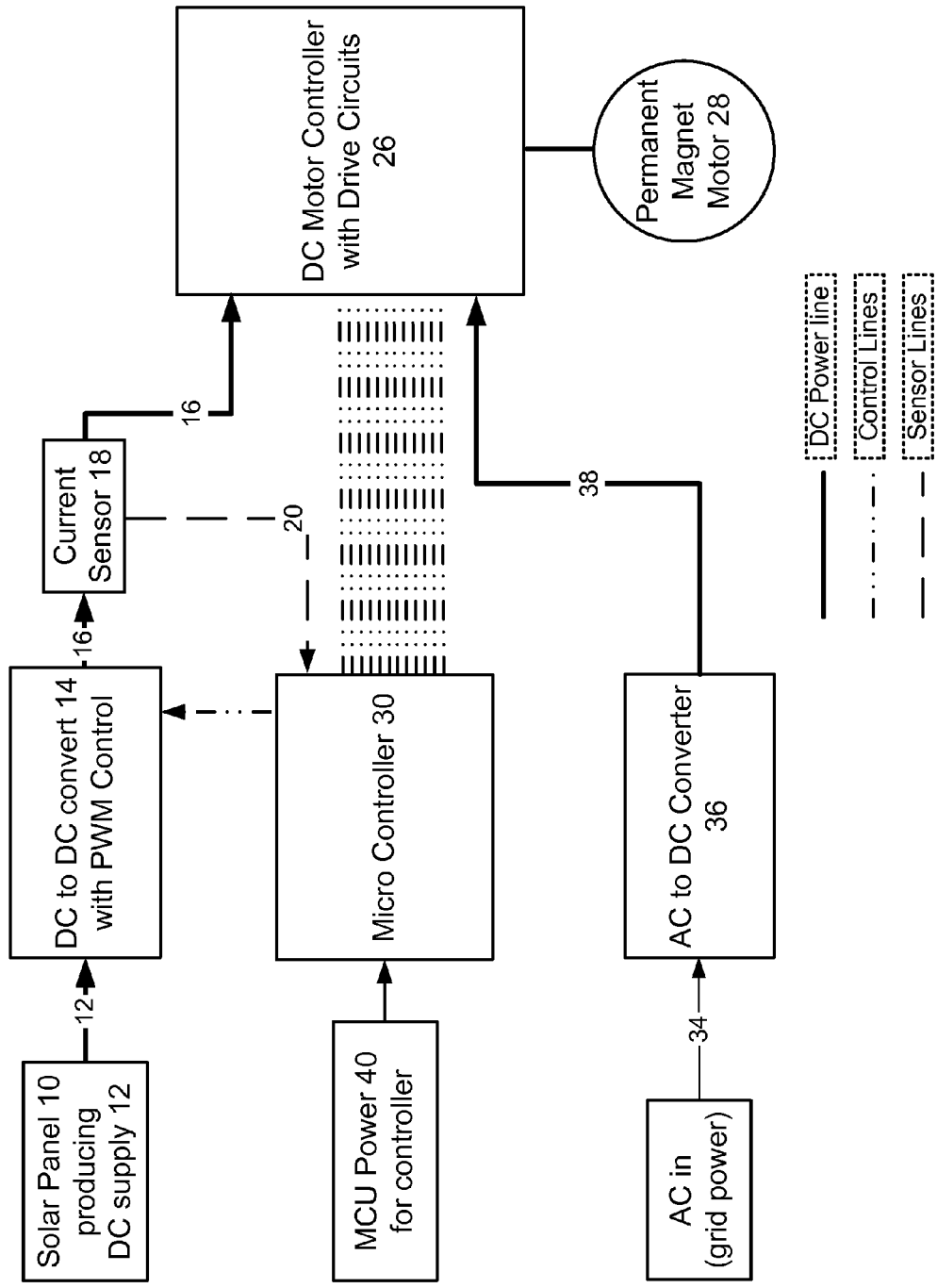
FIG. 3 is an overview circuit diagram showing the preferred main components and circuit paths of the present invention.

The DC supply 12, shown in FIG. 3, is delivered to a DC to DC converter 14 characterized by pulse width modulation control, or PWM control. In the example we are creating, the device could be a ½ horsepower rated permanent magnet 3 phase motor 28 with a maximum 180 volt input. The DC to DC converter for such a device should be a step-up (boost) regulator with PWM control. Technically, the DC to DC converter is not absolutely necessary, but efficiencies are gained by including one.

Figure 2:
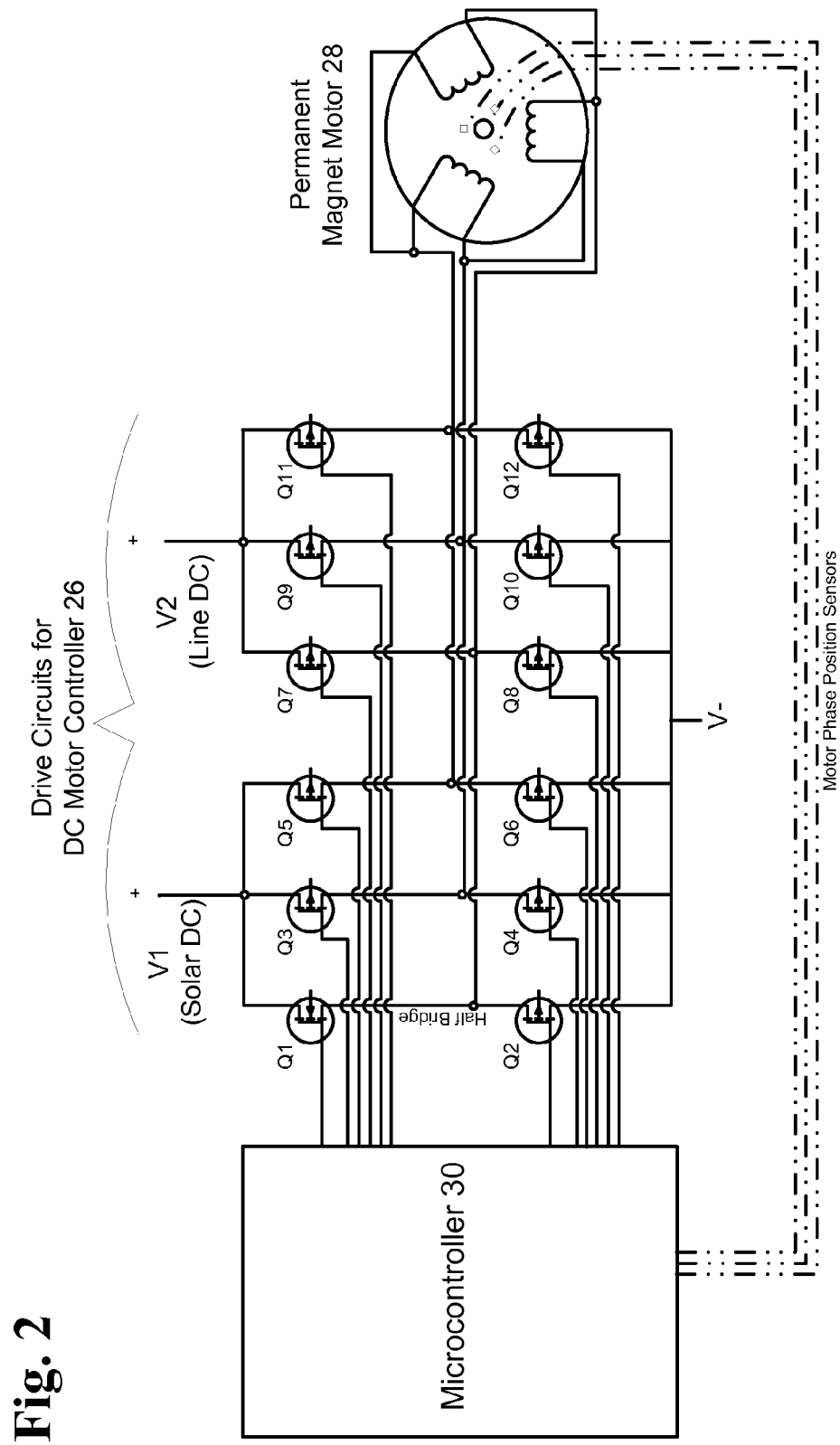
FIG. 2 is a partial circuit diagram, similar to FIG. 1, showing the method and circuitry for combining independent direct current sources according to the present invention.

A current sensor 18 detects how much solar DC 16 can be supplied at a desired voltage, designated "Vset", by the solar panels. The current sensor value is input into a micro controller 30, and the solar DC can be delivered to the drive circuits of a DC Motor Controller 26, as shown in FIG. 2. Where the inductive load is the coils of a three-phase brushless DC motor, there will be at least two half bridges for each of the coils. The inductive load could be a split phase DC motor, in which case there would be one less half bridge per DC source that has independent drive circuits. Multiplying the number of independent DC sources by the number of phases on the motor gives the number of half bridges needed for the drive circuit portion of the DC motor controller. This method would not work well with a standard brushed DC motor.

Position sensors on the motor detect which phase of the motor is the next one that needs power. Optical or mechanical position sensors can be used, such as hall effect position sensors. As is well known in the art, the speed of the motor can be determined by clocking the time between phases of the motor. The same clock can be used to determine which FETs to turn on and off, as well as precisely when to switch them.

When there is not enough solar DC 16 to start or maintain a desired motor speed (in other words, V1 is less than Vset), the micro controller (MCU) 30 detects the insufficiency at the current sensor and turns on V2 FET switches, which are constantly supplied with line DC, to power the current phase of the motor that is demanding power. V1 is allowed to charge a capacitor of the DC to DC converter so that it is hopefully ready to be used by the time the next phase of the motor demands power.

Figure 4:
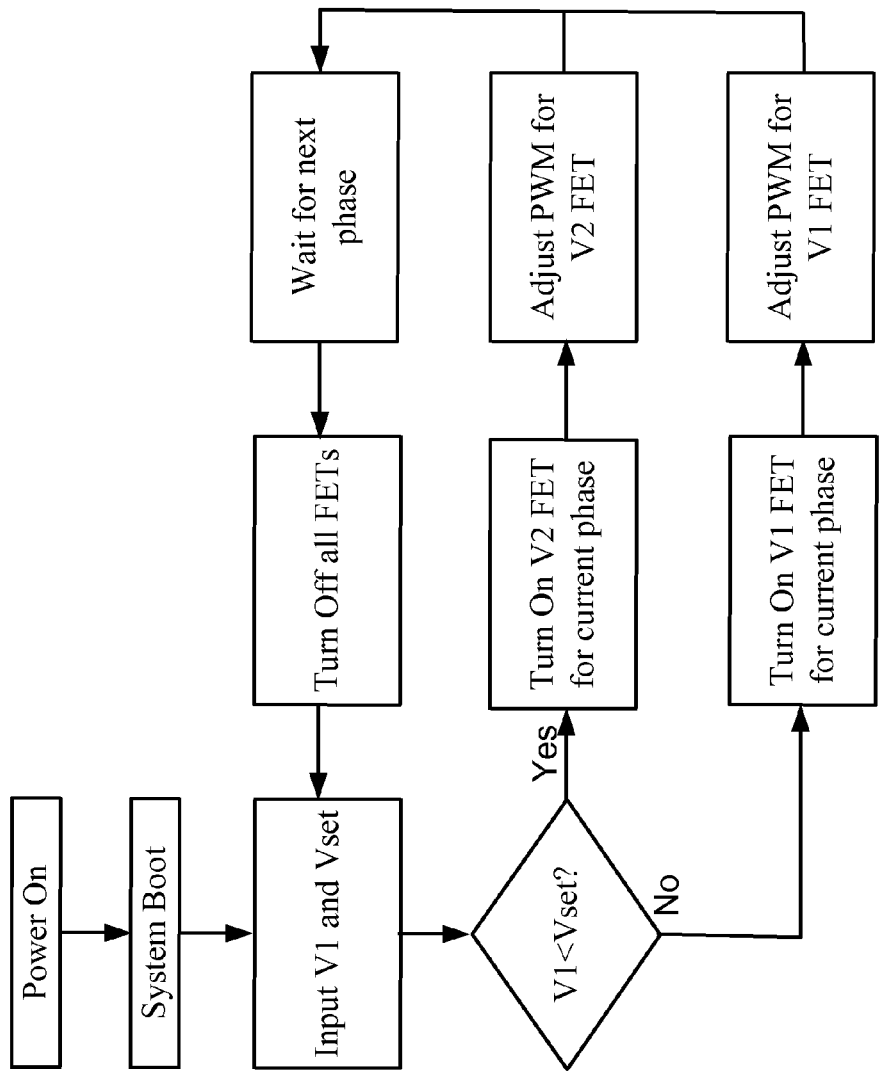
FIG. 4 is a flow chart of computer logic used by the MPU shown in FIG. 3.

FIG. 4 shows the logic that is used by the MCU 30, such as a common 8 bit controller. Any suitable user interface can be combined with the present invention, from a simple wall switch to a programmable climate control panel. Once the power is turned on, the system boots and the MCU acquires a value from the current sensor 18 (from FIG. 3) that tells the program how much solar DC 16 is being produced by the solar panels 10. The computer logic compares the solar DC, V1, to a user selected voltage, Vset. If there is too little solar DC, then the MCU increases the PWM ratio of the boost regulator a little bit, such as one percent, and then the program compares the current values again. If the PWM control reaches 100%, and the solar DC voltage is still not adequate to meet the demands of the motor, then the program selects to turn on V2 FETS. It is important to note that all FETS of the drive circuits are turned off during (preferably at the end of) each phase of the motor. To control the line DC, PWM controls should also be incorporated into V2, such as by using a PWM control in the MCU that controls a FET switch that is on the AC to DC converter. If there is too much V2 power, the MCU manipulates the on/off controls until a desired level of line DC voltage is reached.

The voltage of the AC supply 34, which is grid power, is known and very consistent, so it is not necessary to have a current sensor after the rectifier of the circuit because the current can be calculated by the MCU based on the percentage of time that the PWM control of the AC to DC converter is on.

The micro controller 30, or MCU, is preferably an 8 bit controller with preloaded software containing a computer program that runs the logic shown in FIG. 4. The MCU requires a nominal amount of power, MCU power 40, which can be supplied by small batteries, AC supply and/or solar DC. The main purpose of the MCU is to control the various FET switches that determine the flow of power to the various phases of the motor.

An optional additional purpose of the MCU is to calculate and display information about the system to a user. The ratio of solar DC versus line DC would be useful, both present and average over a defined time period. This type of information could let a user know whether there were any potential problems with the system. Also, the MCU can be used to control the speed of the motor, possibly even by making the MCU programmable based on time of day, temperature or other desired variables.

Although the preferred embodiment simply selects one source, V1 or V2, per phase of the motor, alternatively the two sources could be combined during the same phase. A first way to combine the sources is by closing V1 FETs, such as Q1 and Q2, opening all FETs, and then immediately closing V2 FETs, such as Q7 and Q8, such that the V2 FETs provide a little extra boost to a phase that is otherwise underpowered by V1. A second way to combine the sources is by simultaneously closing V1 and V2 FETs that power the same phase, which will likely require the addition of diodes to prevent the backflow of DC power into the weaker source, as well as additional logic to control the voltage.

While a preferred form of the invention has been shown and described, it will be realized that alterations and modifications may be made thereto without departing from the scope of the following claims. For example, a third independent power source could be added to the system by splicing another set of drive circuits between the MCU and inductive loads.

What is claimed is:

1. A system for supplementing a generated renewable energy DC supply with a utility grid AC supply, comprising:
    a DC motor controller characterized by a first and second set of drive circuits;
    a micro controller for controlling the DC motor controller;
    a generated DC delivered to the first set of drive circuits;
    a current sensor that senses the generated DC;
    a utility grid AC supply, independent from the generated DC, delivered to an AC to DC converter for producing a line DC that is delivered to the second set of drive circuits; and
    a computer program run by the micro controller in a non-transitory readable computer medium for deciding at every phase of every rotation of a brushless DC motor whether to substitute the second drive circuit for the first drive circuit to power the brushless DC motor at a specific instant in time.

2. The system of claim 1 wherein the first drive circuit is characterized by half bridges, and wherein each half bridge is electrically connected to a different coil of the brushless DC motor, and therefore different phases of the brushless DC motor.

3. The system of claim 2 wherein the second drive circuit is characterized by half bridges, and wherein each half bridge is electrically connected in parallel with a different half bridge of the first drive circuit.

4. The system of any of the above claims further comprising PWM (pulse width modulation) control for the generated DC.

5. The system of claim 1 further comprising PWM control for the line DC.

6. The system of claim 1 further comprising a DC to DC converter.

7. The system of claim 1 wherein the brushless DC motor is characterized by three phases, and wherein the first drive circuit is three half bridges that separately power the three phases of the motor.

8. The system of claim 1 further comprising a user display that can be used by a user to view information about the system.

9. The system of claim 8 wherein the user display is programmable by the user.

10. A method for controlling a supplemented power supply comprising the steps of:
   inputting the value of a set voltage and a first voltage, the first voltage being a generated renewable energy;
   determining whether the generated voltage is smaller, larger or equal to the set voltage;
   if the first voltage is larger or equal to the set voltage, then turning on selected FETs of a first drive circuit;
   if the first voltage is smaller than the set voltage, then turning on selected FETs of a second drive circuit that is connected in parallel with the first drive circuit;
   turning off all FETs of the first and second drive circuits at least once per phase of a brushless DC motor; and
   wherein the brushless DC motor is characterized by three phases, and wherein a half bridge of either the first or second drive circuit power each phase of the motor.

11. The method of claim 10 wherein the brushless DC motor is characterized by three phases, and wherein a half bridge or either the first or second drive circuit can independently power each phase of the motor.

12. The method of claim 10 further comprising the step of adjusting the PWM for the FETs of the first voltage.

13. The method of claim 10 further comprising the step of adjusting the PWM for the FETs of the second voltage.

14. The method of claim 10 further comprising the step of not turning on any FETs of the first drive circuit if any FETs of the second drive circuit are closed.

15. The method of claim 10 further comprising the step of turning on FETs of the first drive circuit and second drive circuit during the same phase, but not simultaneously.

\* \* \* \* \*